(12) United States Patent
Guo

(10) Patent No.: US 9,477,545 B2
(45) Date of Patent: Oct. 25, 2016

(54) ERROR CORRECTING SYSTEM AND METHOD FOR SERVER

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Li-Wen Guo, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 140 days.

(21) Appl. No.: 14/465,356

(22) Filed: Aug. 21, 2014

(65) Prior Publication Data

US 2015/0058665 A1  Feb. 26, 2015

(30) Foreign Application Priority Data

Aug. 23, 2013  (CN) .......................... 2013 1 03719159

(51) Int. Cl.
  *G06F 11/07*  (2006.01)
(52) U.S. Cl.
  CPC ....... *G06F 11/0793* (2013.01); *G06F 11/0721* (2013.01)
(58) Field of Classification Search
  CPC ........... G06F 11/0721; G06F 11/0793; G06F 11/2284; G06F 11/2294; G06F 11/2025; G06F 11/2028; G06F 11/2033
  See application file for complete search history.

(56) References Cited

U.S. PATENT DOCUMENTS

| | | | | |
|---|---|---|---|---|
| 7,552,359 B2* | 6/2009 | Takemori | ............ | G06F 11/0724 714/11 |
| 7,966,515 B2* | 6/2011 | Hataski | ............... | G06F 9/4406 714/4.2 |
| 8,677,182 B2* | 3/2014 | Zou | ..................... | G06F 11/0724 714/23 |
| 2007/0088988 A1* | 4/2007 | Gupta | ................. | G06F 11/2268 714/48 |
| 2011/0060941 A1* | 3/2011 | Hataski | ............... | G06F 9/4406 714/4.11 |
| 2012/0117429 A1* | 5/2012 | Zhang | ................... | G06F 11/006 714/718 |
| 2013/0151826 A1* | 6/2013 | Tu | ............................ | G06F 1/24 713/1 |
| 2015/0058666 A1* | 2/2015 | Guo | .................... | G06F 11/0721 714/10 |

* cited by examiner

*Primary Examiner* — Nadeem Iqbal
(74) *Attorney, Agent, or Firm* — Zhigang Ma

(57) ABSTRACT

An error correcting system applied to a server, the server comprising a central processing unit, the central processing unit configured to send a warning signal when the central processing unit generates error. The error correcting system includes a programmable logic device, a baseboard management controller coupled to the programmable logic device, and a basic input output system coupled to the baseboard management controller. The programmable logic device is configured to detect the warning signal and send an interrupt signal to the baseboard management controller after the warning signal is detected. The baseboard management controller is configured to send a notification signal to the basic input output system after receiving the interrupt signal. The basic input output system is configured to retrieve the error and correct the error after receiving the notification signal.

13 Claims, 3 Drawing Sheets ions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media are compact discs (CDs),

ERROR CORRECTING SYSTEM AND METHOD FOR SERVER

RELATED APPLICATIONS

This application claims priority to China Patent Application No. 201310371915.9 filed on Aug. 23, 2013 in the China Intellectual Property Office, the contents of which are hereby incorporated by reference. Relevant subject matter is disclosed in co-pending U.S. Patent Applications entitled "SYSTEM AND METHOD FOR TREATING SERVER ERRORS", U.S. application Ser. No. 14/466,349.

FIELD

The disclosure generally relates to error correcting systems, and particularly relates to an error correcting system applied to a server.

BACKGROUND

A server usually includes a central processing unit, the central processing unit can generate errors during long use.

BRIEF DESCRIPTION OF THE DRAWINGS

Many aspects of the embodiments herein can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

Figure 1:
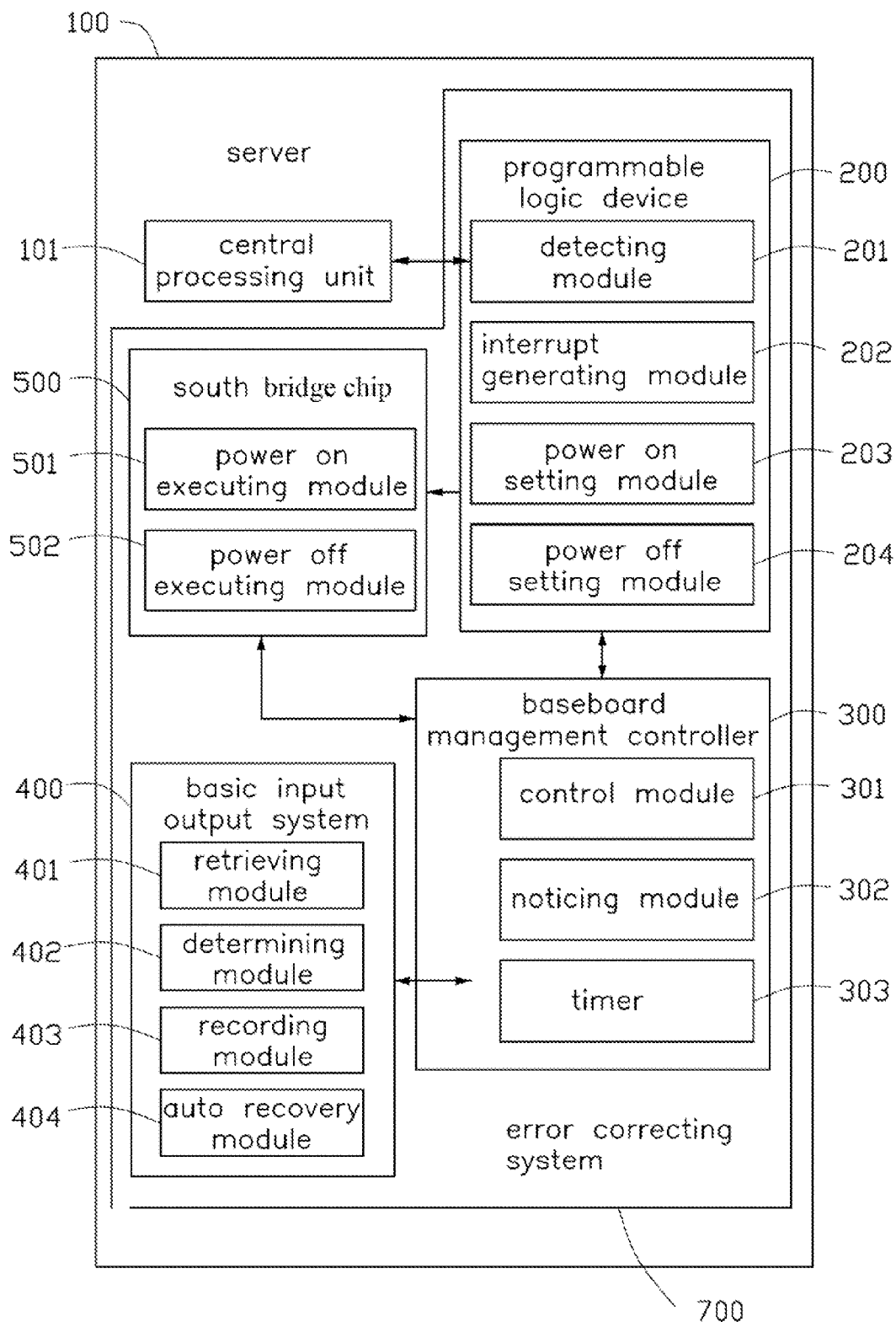
FIG. 1 is a block diagram of one embodiment of an error correcting method.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In general, the word "module," as used herein, refers to logic embodied in hardware or firmware, or to a collection of software instructions, written in a programming language such as Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media are compact discs (CDs), digital versatile discs (DVDs), Blu-Ray discs, Flash memory, and hard disk drives. The term "coupled" is defined as connected, whether directly or indirectly through intervening components, and is not necessarily limited to physical connections. The connection can be such that the objects are permanently connected or releasably connected.

FIG. 1 illustrates an error correcting system 700 can be applied to a server 100. The server 100 can include a central processing unit 101. The central processing unit 101 can send a warning signal when the central processing unit (101) generates error. The error correcting system 700 can include a programmable logic device 200, a baseboard management controller 300 coupled to the programmable logic device 200, a basic input output system 400 coupled to the baseboard management controller 300, and a south bridge chip 500 coupled to the programmable logic device 200 and the baseboard management controller 300.

The programmable logic device 200 can detect the warning signal and send an interrupt signal to the baseboard management controller 300 after the warning signal is detected. The baseboard management controller 300 can be configured to send a notification signal to the basic input output system 400 after receiving the interrupt signal. The basic input output system 400 can be configured to retrieve the error and correct the error after receiving the notification signal.

The programmable logic device 200 can include a detecting module 201, an interrupt generating module 202, a power on setting module 203, and a power off setting module 204. The baseboard management controller 300 can include a control module 301, a notifying module 302, and a timer 303. The basic input out system 400 can include a retrieving module 401, a determining module 402, a recording module 403, and an auto recovery module 404. The south bridge chip 500 can include a power on executing module 501, and a power off executing module 502.

The detecting module 201 can detect the warning signal. The interrupt generating module 202 can be configured to generate the interrupt signal and send the interrupt signal to the notifying module 302. The notifying module 302 is configured to send the notification signal to the retrieving module 401 after receiving the interrupt signal. The retrieving module 401 is configured to retrieve the error after receiving the notification signal. The determining module 402 is configured to determine if the error is matched with a predetermined error. The determining module 402 can be configured to send a restart signal to the baseboard management controller 300 when the error is matched with the predetermined error.

The control module 301 can send a power off signal to the power off setting module 204 after receiving the restart signal. The power off setting module 204 can be configured to send a low level (logic 0) to the power off executing module 502 after receiving the power off signal. The power off executing module 502 can be configured to power off the server 100 after receiving the low level.

The power off executing module 502 can send a starting signal. The timer 303 can be configured to record time when the server 100 is powered off. The control module 301 can be configured to determine if the time is equal to a predetermined time and send a power on signal to the power on setting module 203 when the actual time is greater than the predetermined time. The power on setting module 203 can be configured to send a high level (logic 1) to the power on executing module 501 after receiving the power on signal. The power on executing module 501 can be configured to power on the server 100. The auto recovery module 404 is configured to recover the server 100 when the error is not matched with the predetermined error. The recording module 403 can be configured to record the error.

Figure 2:
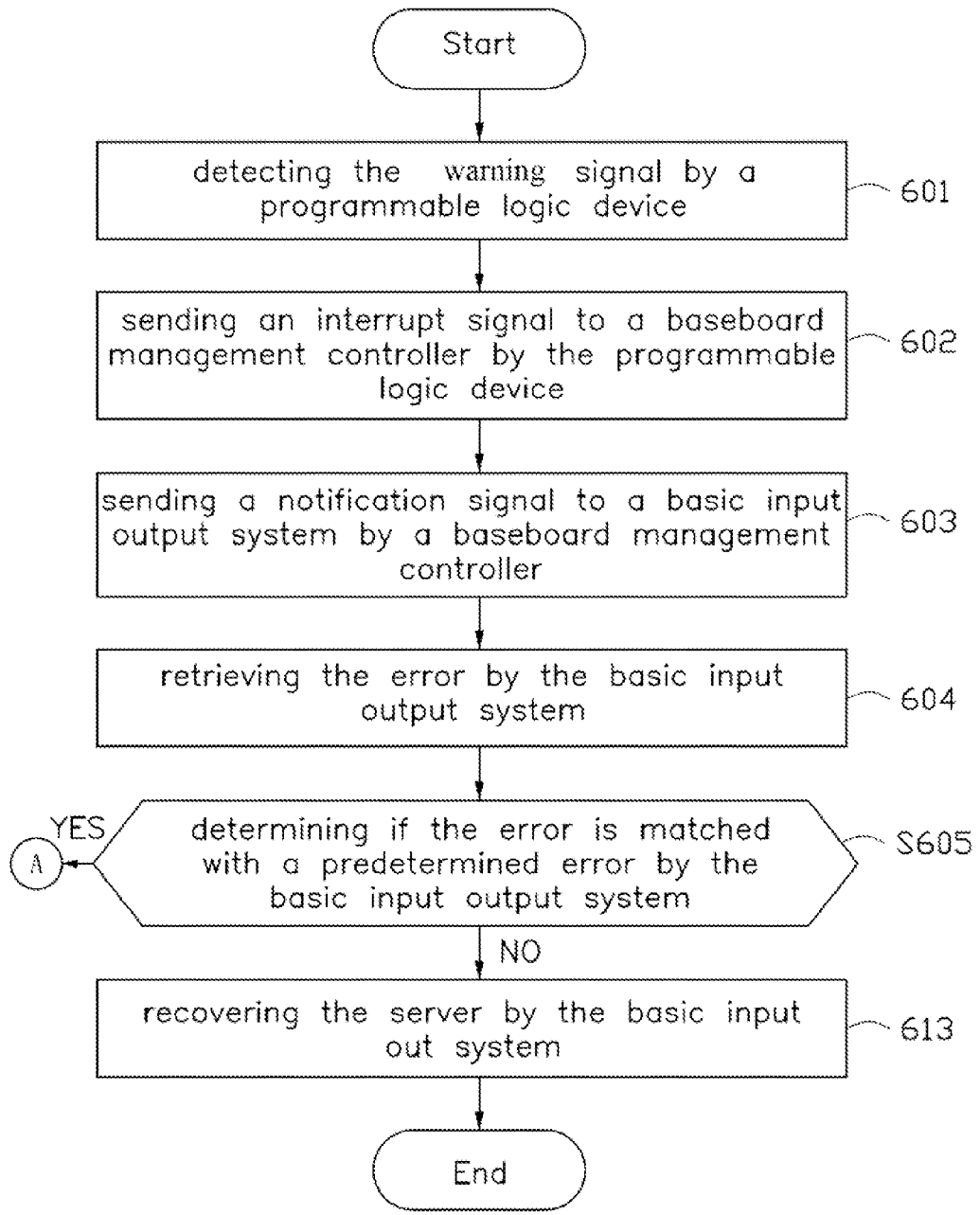
FIG. 2 is a flowchart of an error correcting method.
Figure 3:
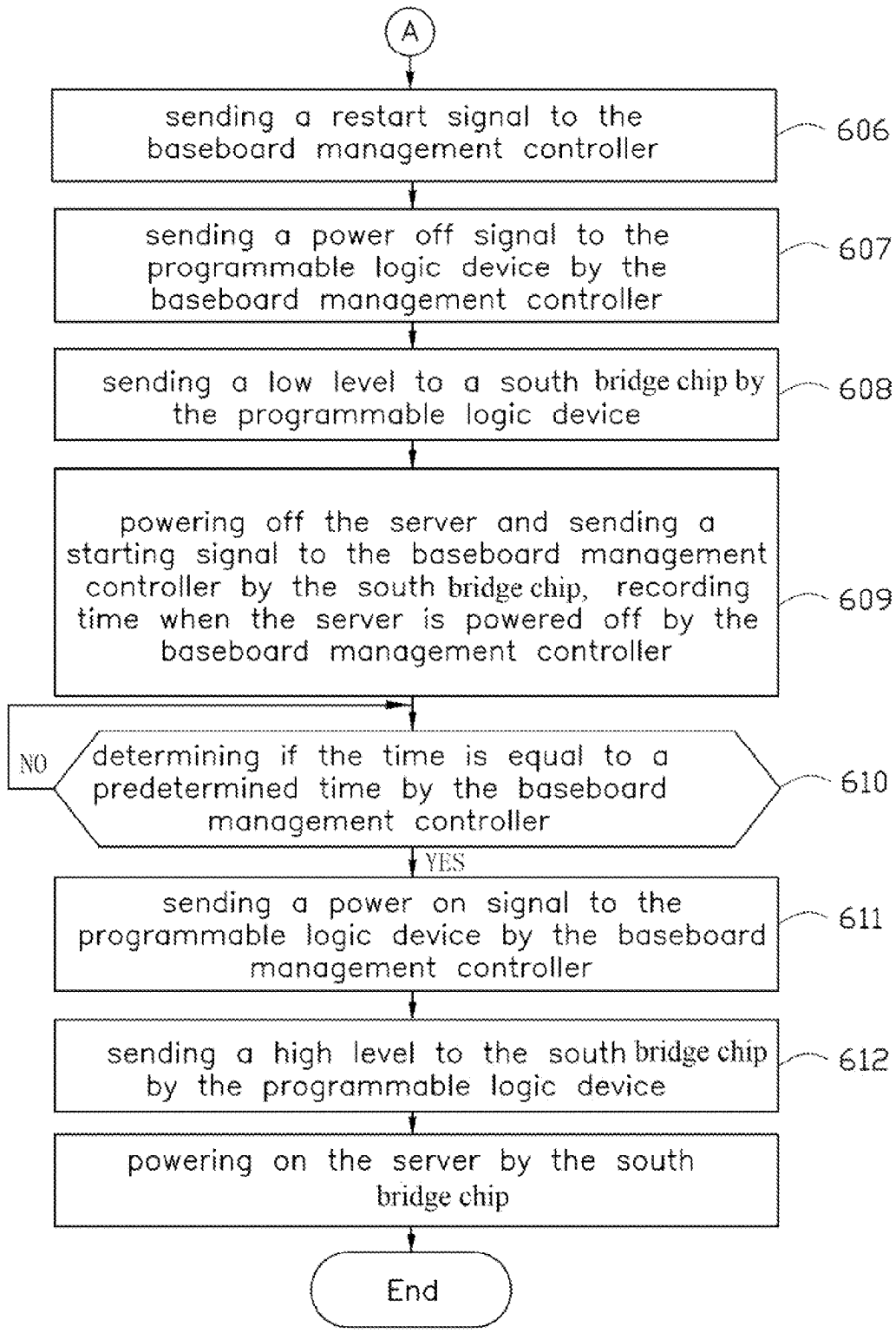
FIG. 3 is another flowchart of FIG. 2.

FIGS. 2-3 illustrate a block of an error correcting method applied to a server, the server comprising a central processing unit, the central processing unit is configured to send a warning signal when the central processing unit generates an error, and the error correcting method comprises the following blocks:

In block 601, detecting the warning signal by a programmable logic device.

In block 602, sending an interrupt signal to a baseboard management controller by the programmable logic device.

In block 603, sending a notification signal to a basic input output system by a baseboard management controller.

In block 604, retrieving the error by the basic input output system.

In block 605, determining if the error is matched with a predetermined error by the basic input output system. When the error is matched with a predetermined error by the basic input output system, the method goes to block 606. When the error is not matched with a predetermined error by the basic input output system, the method goes to block 614.

In block 606, sending a restart signal to the baseboard management controller.

In block 607, sending a power off signal to the programmable logic device by the baseboard management controller.

In block 608, sending a low level (logic 0) to a south bridge chip by the programmable logic device.

In block 609, powering off the server and sending a starting signal to the baseboard management controller by the south bridge chip, and recording time when the server is powered off by the baseboard management controller In block 610, determining if the time is equal to a predetermined time by the baseboard management controller. When the time is equal to a predetermined time by the baseboard management controller, the method goes to block 611. When the time is not equal to a predetermined time by the baseboard management controller, the method goes to block 610.

In block 611, sending a power on signal to the programmable logic device by the baseboard management controller In block 612, sending a high level (logic 1) to the south bridge chip by the programmable logic device.

In block 613, powering on the server by the south bridge chip.

In block 614, recovering the server by the basic input out system.

Certain steps or methods described herein may be removed, others may be added, and the sequence of steps may be altered. The description and the claims drawn for or in relation to a method may give some indication in reference to certain steps. However, any indication given is only to be viewed for identification purposes, and is not necessarily a suggestion as to an order for the steps.

The embodiments described herein are illustrative, and should not be construed as limiting the following claims.

What is claimed is:

1. An error correcting system applied to a server, the server comprising a central processing unit, the central processing unit configured to send a warning signal if the central processing unit generates an error, and the error correcting system comprising:
    a programmable logic device configured to detect the warning signal;
    a baseboard management controller coupled to the programmable logic device;
    wherein the programmable logic device is configured to send an interrupt signal to the baseboard management controller after the warning signal is detected;
    a basic input output system coupled to the baseboard management controller and comprising a determining module; and
    a south bridge chip;
    wherein the baseboard management controller is configured to send a notification signal to the basic input output system after receiving the interrupt signal; and the basic input output system is configured to retrieve the error and correct the error after receiving the notification signal; and the determining module is configured to determine if the error is matched with a predetermined error, and the determining module is further configured to send a restart signal to the baseboard management controller when the error is matched with the predetermined error, and the baseboard management controller is configured to control the south bridge chip to reboot the server after receiving the restart signal.

2. The error correcting system of claim 1, wherein the programmable logic device comprises a detecting module and an interrupt generating module, the detecting module is configured to detect the warning signal, and the interrupt generating module is configured to generate the interrupt signal and send the interrupt signal to the baseboard management controller.

3. The error correcting system of claim 1, wherein the baseboard management controller comprises a noticing module, the basic input output system comprises a retrieving module, the noticing module is configured to send the notification signal to the retrieving module, and the retrieving module is configured to retrieve the error after receives the notification signal.

4. The error correcting system of claim 3, wherein the programmable logic device further comprises a power off setting module, the baseboard management controller further comprises a control module, the south bridge chip comprises a power off executing module, and the control module is configured to send a power off signal to the power off setting module after receives the restart signal, the power off setting module is configured to send a low level signal to the power off executing module after receives the power off signal, and the power off executing module is configured to power off the server after receives the low level signal.

5. The error correcting system of claim 4, wherein the baseboard management controller further comprises a timer, the power off executing module is further configured to send a starting signal, and the timer is configured to record time when the server is powered off.

6. The error correcting system of claim 5, wherein the programmable logic device further comprises a power on setting module, the south bridge chip further comprises a power on executing module, the control module is configured to determine if the time is equal to a predetermined time and send a power on signal to the power on setting module when an actual time is greater than the predetermined time, the power on setting module is configured to send a high level signal to the power on executing module after receives the power on signal, and the power on executing module is configured to power on the server.

7. The error correcting system of claim 3, wherein the basic input output system further comprises an auto recovery module, and the auto recovery module is configured to recover the server when the error is not matched with the predetermined error.

8. The error correcting system of claim 1, wherein the basic input output system further comprises a recording module, and the recording module is configured to record the error.

9. An error correcting method applied to a server, the server comprising a central processing unit, the central processing unit configured to send a warning signal when the central processing unit generates error, and the error correcting method comprising:
- detecting the warning signal by a programmable logic device;
- sending an interrupt signal to a baseboard management controller by the programmable logic device;
- sending a notification signal to a basic input output system by the baseboard management controller;
- retrieving the error by the basic input output system;
- determining if the error is matched with a predetermined error by the basic input output system;
- sending a restart signal to the baseboard management controller when the error is matched with a predetermined error by the basic input output system; and
- controlling to reboot the server by the baseboard management controller; and
- correcting the error by the basic input output system.

10. The error correcting method of claim 9, wherein after sending a restart signal to the baseboard management controller when the error is matched with a predetermined error by the basic input output system and before controlling to reboot the server by the baseboard management controller, and the error correcting method further comprises:
- sending a power off signal to the programmable logic device by the baseboard management controller;
- sending a low level signal to a south bridge chip by the programmable logic device; and
- powering off the server by the south bridge chip.

11. The error correcting method of claim 10, further comprising:
- sending a starting signal to the baseboard management controller by the south bridge chip;
- recording time when the server is powered off;
- determining if the time is equal to a predetermined time by the baseboard management controller; and
- powering on the server by the south bridge chip when the time is equal to the predetermined time.

12. The error correcting method of claim 11, wherein after determining if the time is equal to the predetermined time and before powering on the server by the south bridge chip when the time is equal to the predetermined time, the error correcting method further comprises:
- sending a power on signal to the programmable logic device by the baseboard management controller when the time is equal to the predetermined time; and
- sending a high level signal to the south bridge chip by the programmable logic device.

13. The error correcting method of claim 9, further comprising:
- recovering the server by the basic input output system when the error is not matched with a predetermined error by the basic input output system.

\* \* \* \* \*